US006111739A

United States Patent [19]

Wu et al.

[11] Patent Number: 6,111,739

[45] Date of Patent: Aug. 29, 2000

[54] LED POWER SUPPLY WITH TEMPERATURE COMPENSATION

[75] Inventors: Chen-Ho Wu, Los Altos Hills, Calif.; Han-Jen Chuang, Keelung, Taiwan

[73] Assignee: Leotek Electronics Corporation, Taipei Hsien, Taiwan

[21] Appl. No.: 09/372,686

[22] Filed: Aug. 11, 1999

[51] Int. Cl.[7] ...................................................... H02H 5/04

[52] U.S. Cl. .......................... 361/106; 315/149; 315/225; 340/907

[58] Field of Search .................................... 315/117, 112, 315/114, 115, 116, 119, 149, 225, 291, 150; 361/27, 99, 106, 124, 165; 340/931, 907

[56] References Cited

U.S. PATENT DOCUMENTS

| | | | |
|---|---|---|---|
| 5,397,933 | 3/1995 | Yamada | 327/109 |
| 5,616,846 | 4/1997 | Kwasnik | 73/708 |
| 5,640,085 | 6/1997 | Petr et al. | 324/105 |
| 5,748,429 | 5/1998 | Peterson | 361/106 |
| 5,764,470 | 6/1998 | Mihara et al. | 361/106 |
| 5,783,909 | 7/1998 | Hochstein | 315/159 |
| 5,818,225 | 10/1998 | Miekley et al. | 324/251 |
| 5,885,564 | 3/1999 | Sato et al. | 327/513 |

*Primary Examiner*—Don Wong
*Assistant Examiner*—Wilson Lee
*Attorney, Agent, or Firm*—Limbach & Limbach L.L.P.

[57] ABSTRACT

A circuit for driving a plurality of light emitting diodes (LEDs) that includes a power supply and a voltage divide circuit utilizing positive and negative temperature coefficient thermistors to boost the drive voltage to the LEDs as the ambient temperature deviates from room temperature, which compensates for increased electrical resistance of the LEDs at low temperatures and decreased LED light output efficiency at high temperatures. The circuit also provides a signal voltage to indicate the drive current through the LEDs, and includes a transistor to shut down the power supply when the signal voltage drops below a predetermined level (i.e. the number of burned out LEDs exceeds a predetermined number). A compensation circuit utilizes a thermistor to boost the signal voltage as the ambient temperature drops to compensate for the characteristic turn-on voltage of the transistor that increases as the temperature of the transistor drops.

20 Claims, 4 Drawing Sheets

LED POWER SUPPLY WITH TEMPERATURE COMPENSATION

FIELD OF THE INVENTION

The present invention relates to power supplies for Light Emitting Diodes (LEDs), and more particularly to a power supply that includes temperature compensation to maintain a constant light output from the LEDs throughout a wide range of operating temperatures.

BACKGROUND OF THE INVENTION

Light emitting diode (LED) lamps have been developed to replace conventional incandescent or fluorescent lamps to reduce electrical and maintenance costs and to increase reliability. LED lamps consume less electrical energy than conventional lamps while exhibiting much longer lifetimes. Such lamps are typically powered by a switching power supply, which provides a substantially constant output voltage even with large changes in the input voltage and the ambient temperature.

One popular application for LED lamps is in traffic signals. LED lamps are used to replace conventional 8 and 12 inch round signs, pedestrian signs, hand signs, arrow signs and signs with messages used in traffic signals. Such LED lamps typically include a switching power supply that operates over an input voltage range of 85–130 VAC, while producing a substantially constant output voltage to operate the LEDs. The switching power supply also senses a “fail state” situation, where more than a predetermined number of LEDs have failed (burned out). When a “fail state” is detected, the power supply for the LED lamp shuts down and a signal is sent to the traffic maintenance unit for repair.

LED traffic lamps are exposed to widely changing climate conditions. Therefore, agencies like the Institute of Transportation Engineers have developed output specifications for LED traffic lamps. These specifications call for the LED traffic lamps to provide a minimum specified light output throughout an ambient temperature range of −40° C. to +74° C. While typical switching power supplies can supply a fixed output voltage to the LED lamp throughout the specified temperature range, there are several temperature induced problems that may cause LED lamps to fail to meet the light output specifications.

The first such temperature induced problem occurs with low ambient temperatures. As the ambient temperature of the LEDs drop down toward −40° C., the electrical resistance of the LEDs rises (forward voltage rises, where the forward voltage is the voltage required across the LEDs to pass a predetermined current through the LEDs), thus causing the operating current to drop. The lower operating current causes an undesired drop in the light output level from the LEDs, possibly even below the minimum specified level.

The second temperature induced problem occurs with high ambient temperatures. As the ambient temperature rises toward +74° C., the efficiency of the LEDs drops, causing the light output level to drop even though the drive current stays relatively constant.

The third temperature induced problem relates to the detection of the “fail state” condition. Conventional switching power supplies utilize a transistor to turn off the power to the LEDs when the fail state condition occurs (i.e. more than a predetermined number of LEDs are burned out). This circuitry senses the overall current through the LEDs. If the LED drive current drops below a certain level, the turn-on voltage to the transistor is reduced to the point that it shuts off, thus shutting off power to the LEDs. The problem with this design, however, is that the turn-on voltage level needed to turn the transistor on and off varies with temperature. Thus, the “fail state” function of turning off the LED lamp when a predetermined number of LEDs are burned out does not function consistently for different ambient temperatures.

There is a need for an LED lamp that provides relatively constant light output at low and at high temperatures. There is also a need for such an LED lamp to consistently turn itself off when a predetermined number of LEDs are burned out, where the predetermined number does not change significantly with changes in ambient temperature.

There are a number of conventional temperature compensation circuit designs that use sensors (U.S. Pat. No. 5,818,225, U.S. Pat. No. 5,640,085), FET variable resistors (U.S. Pat. No. 5,397,933) strain gauge pressure sensors (U.S. Pat. No. 5,616,846), and pulse frequency/width adjustment (U.S. Pat. No. 5,783,909, U.S. Pat. No. 5,886,564). However, these temperature compensation schemes are complex and expensive.

SUMMARY OF THE INVENTION

The present invention solves the aforementioned problems by providing a LED lamp with an inexpensive power supply of simple design that boosts voltage to the LEDs when the temperature deviates from room temperature, and modifies the turn-on voltage used to operate the power supply so that the LEDs are shut off when a predetermined number of LEDs are burned out in a consistent manner that is independent of the ambient temperature.

The present invention is a circuit for driving a plurality of light emitting diodes that includes a power supply for generating an output voltage between a pair of output terminals that drives a plurality of light emitting diodes, and a voltage dividing circuit electrically connected to the pair of output terminals for adjusting the output voltage. The voltage dividing circuit includes a positive temperature coefficient thermistor having a positive resistance slope characteristic wherein the resistance of the positive temperature coefficient thermistor increases as ambient temperature increases, and a negative temperature coefficient thermistor having a negative resistance slope characteristic wherein the resistance of the negative temperature coefficient thermistor decreases as ambient temperature increases. The positive and negative temperature coefficient thermistors are electrically connected, and the positive and negative resistance slope characteristics are selected, to increase the output voltage between the pair of output terminals when ambient temperature of the driving circuit deviates from room temperature.

In another aspect of the present invention, a circuit for driving a plurality of light emitting diodes includes a power supply for generating an output voltage between a pair of output terminals that drives a plurality of light emitting diodes, a transistor having a characteristic turn-on voltage, and a compensation circuit. The transistor is electrically connected to the power supply for receiving a signal voltage from one of the pair of output terminals and for turning off the output voltage of the power supply when the signal voltage drops below the characteristic turn-on voltage of the transistor. The characteristic turn-on voltage varies with ambient temperature of the transistor. The compensation circuit includes a thermistor having a resistance that changes with changes in ambient temperature. The compensation circuit is electrically connected to the transistor to modify the signal voltage inputted to the transistor so that the transistor turns off the output voltage at a constant predetermined signal voltage independent of ambient temperature changes of the transistor.

In yet another aspect of the present invention, a traffic signal lamp includes a plurality of light emitting diodes, a power supply electrically connected to the plurality of light emitting diodes for generating an output voltage that drives the plurality of light emitting diodes, and a voltage dividing circuit electrically connected to the power supply for adjusting the output voltage. The voltage dividing circuit includes a positive temperature coefficient thermistor having a positive resistance slope characteristic wherein the resistance of the positive temperature coefficient thermistor increases as ambient temperature increases, and a negative temperature coefficient thermistor having a negative resistance slope characteristic wherein the resistance of the negative temperature coefficient thermistor decreases as ambient temperature increases. The positive and negative temperature coefficient thermistors are electrically connected, and the positive and negative resistance slope characteristics are selected, to increase the output voltage when ambient temperature of the traffic signal lamp deviates from room temperature.

In yet one more aspect of the present invention, a traffic signal lamp includes a plurality of light emitting diodes, a power supply electrically connected to the plurality of light emitting diodes for generating an output voltage that drives the plurality of light emitting diodes and for generating a signal voltage that is proportional to the electrical current through the plurality of light emitting diodes, a transistor having a characteristic turn-on voltage, and a compensation circuit. The transistor is electrically connected to the power supply for receiving the signal voltage and for turning off the output voltage of the power supply when the signal voltage drops below the characteristic turn-on voltage of the transistor. The characteristic turn-on voltage varies with ambient temperature of the transistor. The compensation circuit includes a thermistor having a resistance that changes with changes in ambient temperature. The compensation circuit is electrically connected to the transistor to modify the signal voltage inputted to the transistor so that the transistor turns off the output voltage at a constant predetermined signal voltage independent of ambient temperature changes of the transistor.

In yet another aspect of the present invention, a traffic signal lamp includes a plurality of light emitting diodes, a power supply electrically connected to the plurality of light emitting diodes for generating an output voltage that drives the plurality of light emitting diodes, and a voltage dividing circuit electrically connected to the power supply for adjusting the output voltage. The voltage dividing circuit includes a thermistor having a predetermined resistance slope characteristic wherein the resistance of the thermistor changes as ambient temperature changes. The thermistor is electrically connected, and the predetermined resistance slope characteristic is selected, to produce a predetermined change in the output voltage when ambient temperature of the traffic signal lamp deviates from room temperature.

Other objects and features of the present invention will become apparent by a review of the specification, claims and appended figures.

DETAILED DESCRIPTION OF THE PREFERRED EMBODIMENTS

The present invention is an LED power supply that boosts drive voltage to the LEDs as the ambient temperature rises above or drops below room temperature. The LED power supply also consistently shuts off the LED drive voltage when a predetermined number of LEDs have burned out, even if the temperature drops well below or rises well above room temperature.

Figure 1:
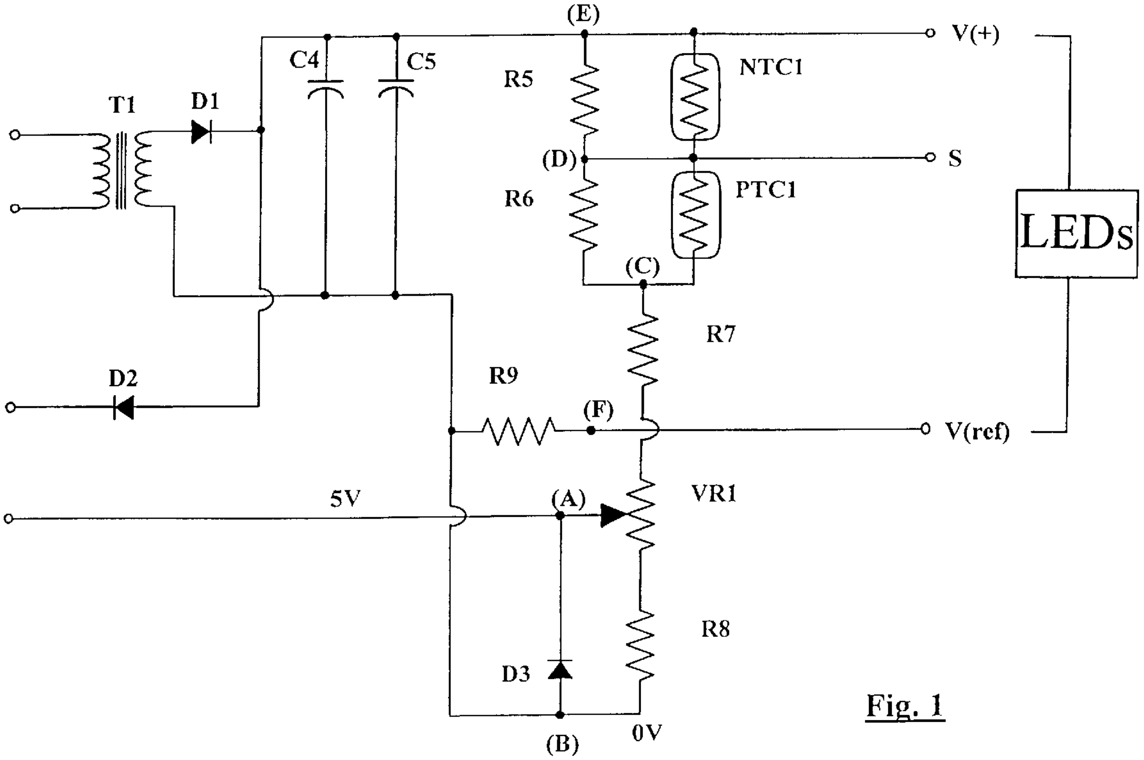
FIG. 1 is a plan view of the output portion of the LED power supply of the present invention.

The output portion of the LED power supply of the present invention is illustrated in FIG. 1, and includes a transformer T1, diodes D1–D3, capacitors C4–C5, resisters R5–R9, variable resister VR1, a positive temperature coefficient thermistor PTC1 and a negative temperature coefficient thermistor NTC1, all connected together as illustrated in FIG. 1. The LEDs are connected to terminals V(+) and Vref. Capacitors C4 and C5 are connected in parallel between terminal V(+) and resistor R9, which is connected to terminal Vref. NTC1 is connected in parallel with resistor R5, and PTC1 is connected in parallel with resistor R6.

In such a power supply, the output voltage between V(+) and Vref is determined by a voltage dividing circuit, which includes R5–R8, VR1, NTC1 and PTC1. More specifically, the ratio of overall resistances of two resistor sets in the voltage dividing circuit dictates the output voltage between V(+) and Vref. The first resistor set is resistor R8 and the lower portion of variable resistor VR1 connected to resistor R8 illustrated in FIG. 1. The second resistor set is the upper portion of variable resistor VR1 (as illustrated in FIG. 1), and resistors R5–R7, NTC1 and PTC1.

NTC1 is a negative temperature coefficient thermistor that has a resistivity $R_{NTC1}$ that decreases as its temperature increases. In contrast, PTC1 is a positive temperature coefficient thermistor that has a resistivity $R_{PTC1}$ that increases as its temperature increases. The combination of both PTC1 and NTC1 in the circuit shown in FIG. 1 cause the voltage for driving the LEDs to increase as the ambient temperature deviates from room temperature, as explained below.

If the voltage at point A is $V_A$, and the voltage at point B is zero, then the voltage V(+) at point E is determined by the following formula:

$$V(+)=V_{A-E}-V_{A-B} \quad (1)$$

$$=V_{A-B}\times(R_{A-C}+R_{C-E})/(R_{A-B})+V_A \quad (2)$$

where $V_{A-E}$ is the voltage between point A and point E;

$R_{A-C}$ is the resistance between point A and point C;

$R_{C-E}$ is the resistance between point C and point E; and $R_{A-B}$ is the resistance between point A and point B.

Regarding these resistance values:

$R_{A-C}$ is R7 plus the upper portion of VR1; and $R_{A-B}$ is R8 plus the remaining portion of VR1.

$R_{C-E}$ can be determined from the following formula:

$$R_{C-E}=(R_6\times R_{PTC1})/(R_6+R_{PTC1})+(R_5\times R_{NTC1})/(R_5+R_{NTC1}) \quad (3)$$

Figure 3:
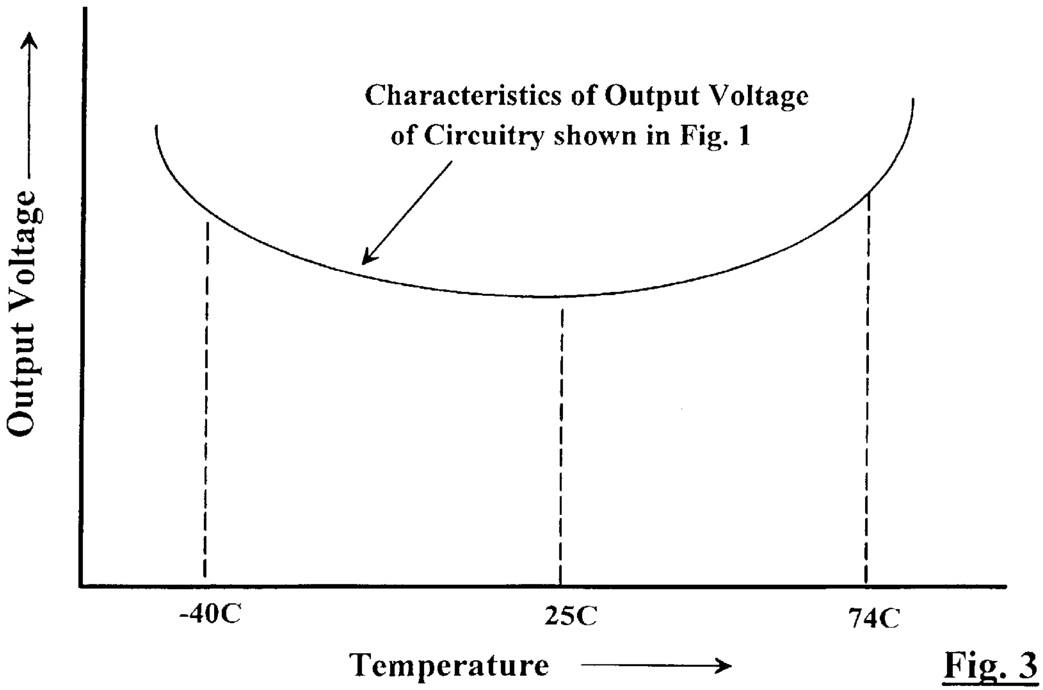
FIG. 3 is a graph illustrating the output voltage from the LED power supply of the present invention.

Variable resistor VR1 is used to vary $R_{A-C}$ and $R_{A-B}$. The values of the resistors R5–R9 and variable resister VR1, as well as the slope characteristics of PTC1 and NTC1 are selected to provide the output voltage across V(+) and V(ref) according to FIG. 3. The output voltage to the LEDs increases both as the ambient temperature decreases from room temperature toward −40° C., and as the ambient temperature increases from room temperature toward +74° C. The amount of voltage increase induced by ambient temperatures below room temperature is selected to maintain a constant drive current $I_{LED}$ through the LEDs, even though the LED resistance increases. Likewise, the amount of voltage increase induced by ambient temperatures above room temperature is selected to increase the drive current $I_{LED}$ through the LEDs to maintain a constant light output, even though the LED efficiency drops.

The example below illustrates how a substantially constant light output is achieved using the circuit of FIG. 1.

EXAMPLE 1

Figure 2:
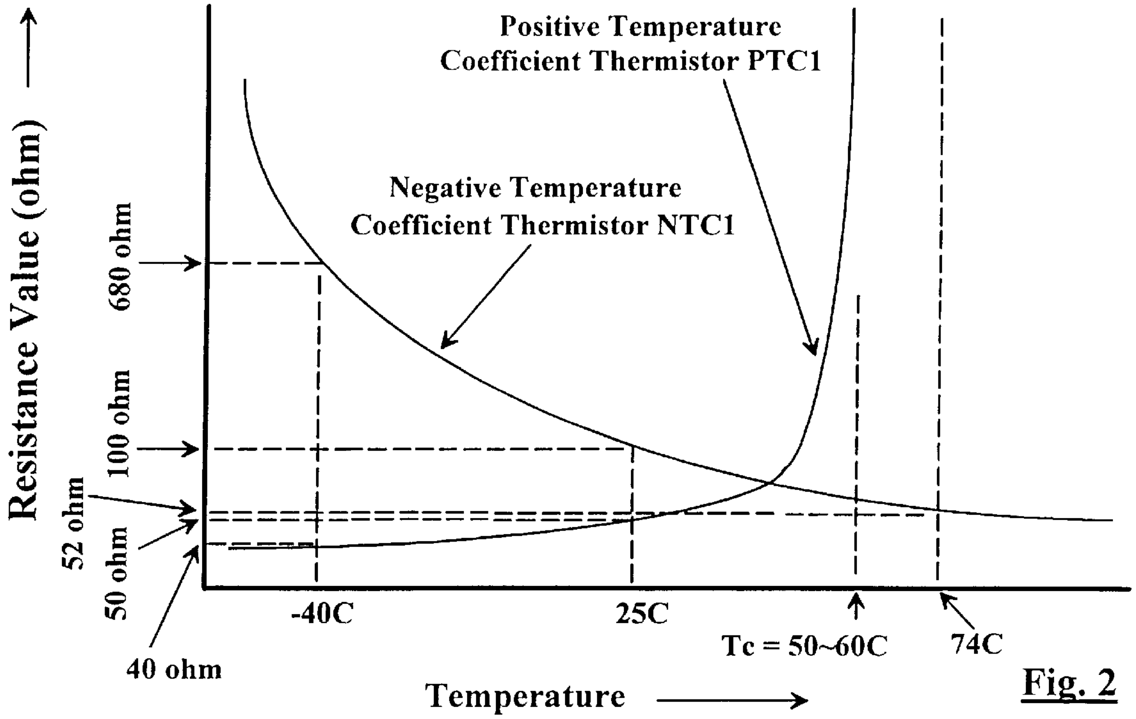
FIG. 2 is a graph illustrating the resistance curves for the positive and negative temperature coefficient thermistors of the present invention.

The following is a selection of values for each element shown in FIG. 1 for a preferred embodiment:

$V_A$=5V,

R5=680 ohm,

R6=400 ohm,

R7=3.56 k ohm,

R8=1 k ohm,

R9=2.5 ohm, $R_{NTC1}$=100 ohm (at 25° C.), with a resistance curve according to FIG. 2, $R_{PTC1}$=50 ohm (at 25° C.), with a resistance curve according to FIG. 2, VR1 is set with 170 ohm resistance in its upper portion, and 120 ohm resistance in its lower portion.

From equation 3, $R_{C-E}$ at 25° C. is calculated to be:

$$R_{C-E}=(400\times 50)/(400+50)+(680\times 100)/(680+100)$$

$$=131.62 \text{ ohm}$$

Thus, from equation 2, V(+) is calculated to be:

$$V(+)=5V\times(3730+131.62)/1120+5V$$

$$=22.24V$$

The voltage V(ref) which is designated as $V_{F-B}$ is calculated by:

$$V_{F-B}=R9\times I_{LED} \quad (4)$$

where $I_{LED}$ is the LED drive current flowing from terminal V(+) to terminal $V_{ref}$. For this example, R9=2.5 ohm and $I_{LED}$ under normal operating conditions at room temperature is 0.7 amp. Thus, from equation 4:

$$V_{F-B}=2.5\times 0.7$$

$$=1.75V.$$

The voltage $V_{E-F}$ which is the voltage applied to the LEDs, is determined by:

$$V_{E-F}=V(+)-V_{F-B} \quad (5)$$

$$=22.4V-1.75V$$

$$=20.49V \text{ (at 25° C.)}.$$

As the temperature drops from room temperature to −40° C., $R_{NTC1}$ jumps from 100 ohm to 680 ohm, and $R_{PTC1}$ drops from 50 ohm to 40 ohm. In addition, the forward voltage of the LEDs increases with drops in temperature, which in turn lowers the current through the LEDs and resistor R9, thus lowering $V_{F-B}$. The amount of forward voltage increase depends on the type of LED's used. For the purposes of the following calculations, the total current through AlInGaP type LED's at −40° C. was measured to be 0.55 amps. Therefore, at −40° C., $V_{F-B}$=2.55×0.55=1.375V.

Thus, from equation 3, $R_{C-E}$ at −40° C. is calculated to be:

$$R_{C-E}=(400\times 40)/(400+40)+(680\times 680)/(680+680)$$

$$=376.36 \text{ ohm}$$

From equation 2, V(+) is calculated to be:

$$V(+)=5V\times(3730+376.36)/1120+5V$$

$$=23.33V$$

Thus, from equation 5, the voltage $V_{F-F}$ applied to the LEDs at −40° C. is:

$$V_{E-F}=23.33-1.375$$

$$=21.955 \text{ (at −40° C.)}.$$

$V_{E-F}$ is 1.465V higher at −40° C. than at room temperature. The additional voltage is sufficient to drive the LEDs so that their light output is almost the same as that at 25° C. It should be noted that the LED efficiency is higher at low temperatures, so a slightly lower LED current at low temperature can still generate a similar light output as a higher LED current at room temperature. Therefore, in order to maintain substantially the same light output at −40° C., the increase in VELF does not have to be high enough to boost the LED current back to the LED operating current at room temperature. Without the increase of 1.465V in output voltage, the LED light output would be too low to meet the light output specification at −40° C.

As the temperature rises from room temperature to +74° C., NTC1 drops from 100 ohm to 52 ohm, and PTC1 jumps from 50 ohm to infinity. In addition, the forward voltage of the LEDs decreases with increases in temperature, which in turn increases the current through the LEDs and resistor R9, thus increasing $V_{F-B}$. The amount of forward voltage decrease depends on the type of LED's used. For the purposes of the following calculations, the total current through AlInGaP type LED's at 74° C. was measured to be 0.90 amps. Therefore, at 74° C., $V_{F-B}$=2.55×0.90=2.25V.

Thus, from equation 3, $R_{C-E}$ at 74° C. is calculated to be:

$$R_{C-E}=400+(680\times 52)/(680+52)$$

$$=448.31 \text{ ohm}$$

From equation 2, V(+) is calculated to be:

$$V(+)=5V\times(3730+448.31)/1120+5V$$

$$=23.65V$$

Thus, from equation 5, the voltage $V_{E-F}$ applied to the LEDs is:

$$V_{E-F}=V(+)-V_{F-B}$$

$$=23.65-2.25$$

$$=21.40 \text{ (at } +74^\circ \text{ C.).}$$

$V_{E-F}$ is 0.91V higher at +74° C. than the voltage at room temperature. The additional voltage is sufficient to increase the drive current $I_{LED}$ to the LEDs to compensate for the fact that LEDs have lower light output efficiency at high temperatures. Without the increase of 1.91V in output voltage with the increased temperature, the LED light output would be too low to meet the light output specification at 74° C. It should be noted that the drive current at high temperatures should not exceed the maximum rated current for the LEDs to prevent premature LED degradation.

As can been seen from the above example, the use of NTCs and PTCs in the LED drive circuit provide a simples, inexpensive and reliable way of boosting the LED drive voltage as the ambient temperature strays away from room temperature, thus ensuring a consistent light output from the LEDs. It should be appreciated that the desired amount of output voltage increase with changes in temperature can be achieved by selecting the appropriate resistor values and PTC and NTC temperature coefficient slopes.

The present invention also includes temperature compensation for the detection of a "fail state" condition. Each LED that burns out reduces the total light output from the LED lamp, as well as reducing the total drive current $I_{LED}$ through the LEDs. A "fail state" condition exists when more than a predetermined number of LEDs are burned out. Once a fail state condition occurs, there are no longer enough working LEDs to provide the required light output from the LED lamp. Therefore, once a fail state condition is detected, power to the LEDs is completely shut off, and a signal is sent to the traffic maintenance unit for repair.

Figure 4:
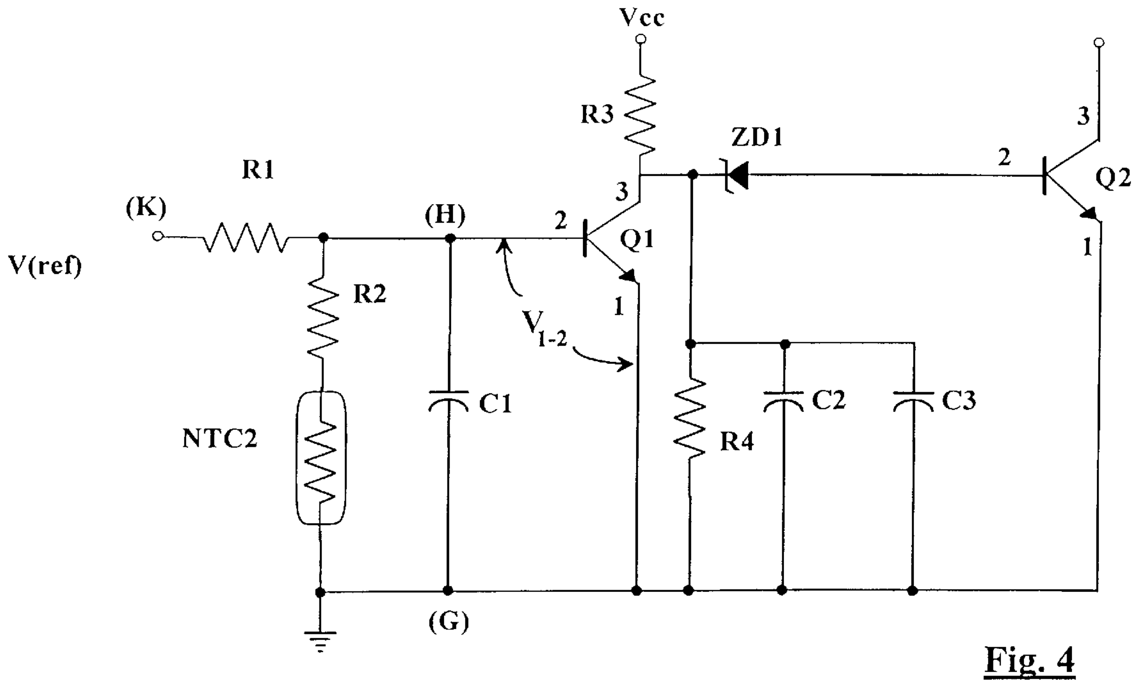
FIG. 4 is a plan view of the fail state detection circuit of the present invention.

FIG. 4 illustrates the fail state detection circuit of the present invention, which includes transistors Q1 and Q2, resistors R1–R4, capacitors C1–C3, a zenor diode ZD1, and a negative temperature coefficient thermistor NTC2, all connected together as illustrated in FIG. 4.

Transistor Q1 operates the power to the LEDs. When base-emitter voltage $V_{1-2}$ reaches the transistor turn-on voltage for transistor Q1, it turns on to turn on the power to the LEDs. As LEDs start burning out, the total LED drive current $I_{LED}$ will drop, which causes $V_{ref}$ to drop because of the lower current through R9 (see FIG. 1). $V_{1-2}$ drops as $V_{ref}$ drops. Therefore, as $V_{ref}$ drops lower and lower with each additional LED burn out, $V_{1-2}$ will eventually fall below the turn-on voltage of Q1, causing Q1 to turn off (thus turning off the power to the LEDs). The values for the elements in FIG. 4 can be selected so that the power to the LEDs will turn off when any desired number of LEDs (i.e. 30%) are burned out. The fail state condition prevents the lamp from operating with an excessive number of LED's being burned out and the total light output power falling below an acceptable value.

Figure 5:
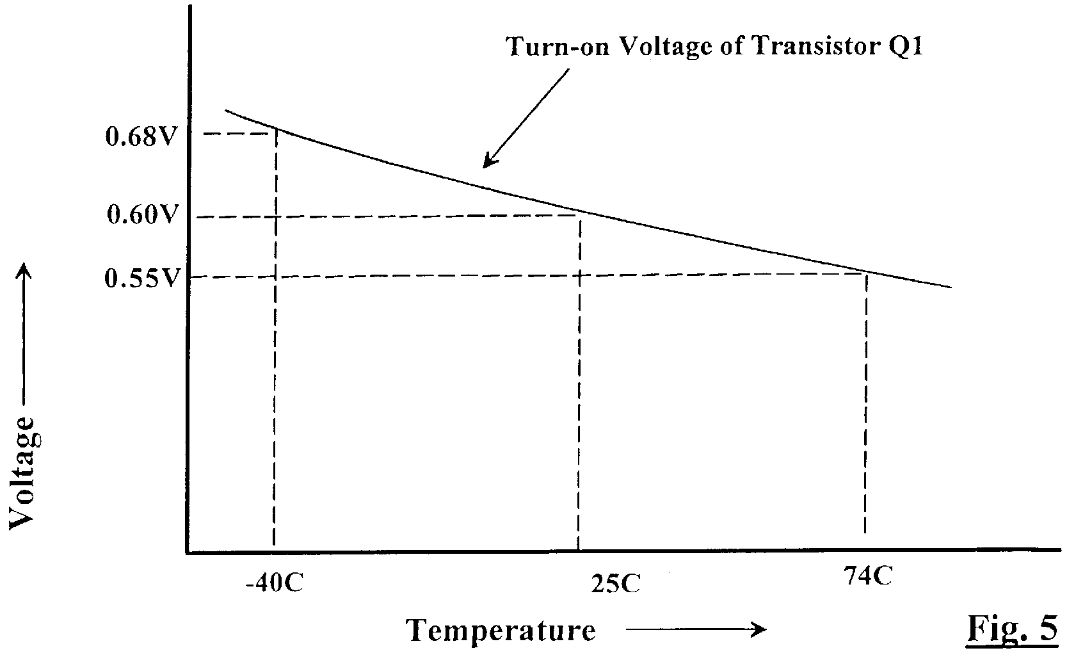
FIG. 5 is a graph illustrating the turn-on voltage of a transistor in the fail state detection circuit of the present invention.

One problem with using a transistor to turn the LEDs on and off is that the turn-on voltage for Q1 varies with temperature, as illustrated in FIG. 5. As the temperature drops, the turn-on voltage of the transistor increases due to the energy band-gap increase in the transistor. Likewise, the turn-on voltage for Q1 decreases at the temperature increases. Thus, the number of burned out LEDs required to lower $V_{1-2}$ enough to cause a detected fail state condition will vary depending upon the ambient temperature of Q1. To compensate for this, the circuit of FIG. 4 includes a transistor turn-on voltage compensation circuit comprising resistor R2 and negative temperature coefficient thermistor NTC2, which provides compensation to $V_{1-2}$ so that Q1 consistently turns on and off when the desired number of LEDs are burned out, even if the ambient temperature varies from −40° C. to +74° C.

The voltage between point H and G ($V_{H-G}$) is:

$$V_{H-G)}=V_{ref}\times(\mathbf{R2}+\mathbf{NTC2})/(\mathbf{R2}+\mathbf{NTC2}+\mathbf{R1})\times1.1 \quad (6)$$

where the factor 1.1 is introduced due to a ripple in the signal, and the voltage at point K ($V_{K-G}$) is $V_{ref}$.

The values of R1, R2 and NTC2 are set so that $V_{1-2}$ falls below the turn-on voltage of Q1 when the total current through the LEDs falls below, say, 30% (which corresponds to 30% of the LEDs being burned out). As the turn-on voltage of Q1 changes due to temperature changes, NTC2 causes a substantially equal corresponding change to $V_{1-2}$ to prevent any temperature induced change to the number of burned out LEDs that would cause a detected fail-state condition.

The following example illustrates the operation of the circuit illustrated in FIG. 4.

EXAMPLE 2

Figure 6:
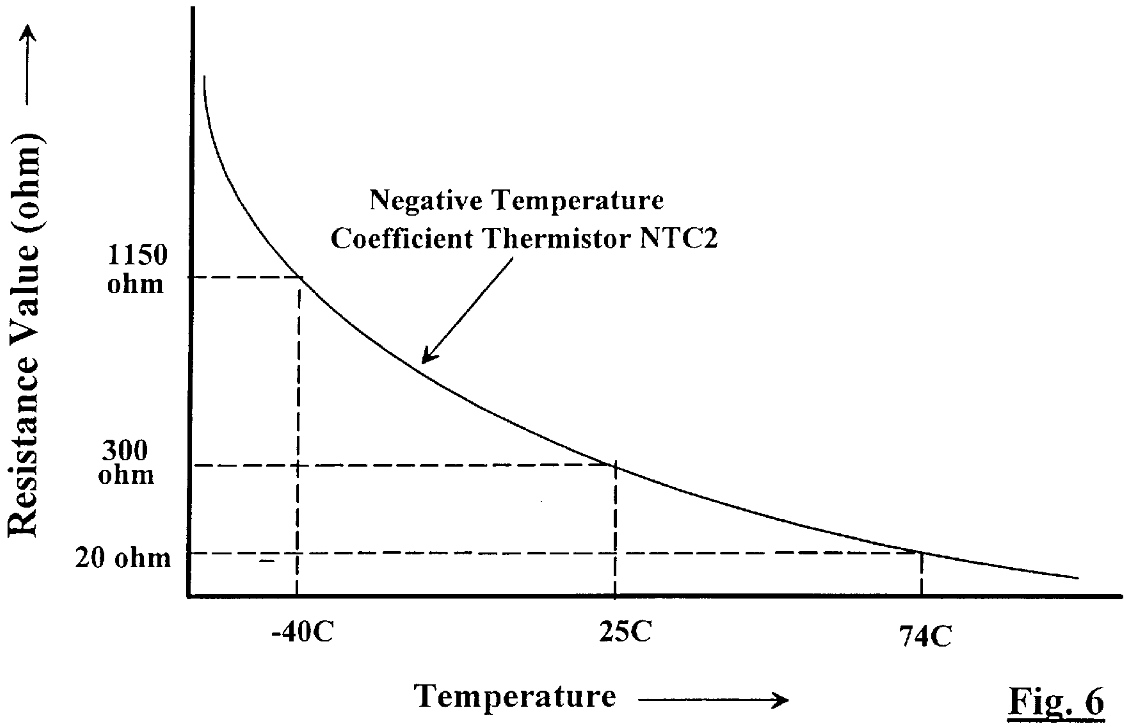
FIG. 6 is a graph illustrating the resistance curve for the negative temperature coefficient thermistor in the fail state detection circuit of the present invention.

The following is a selection of values for each element shown in FIG. 4 for a preferred embodiment:

$V_{ref}$=1.75V at 25° C. (see example 1),

R1=825 ohm,

R2=365 ohm,

NTC2=300 ohm (at 25° C.), with a resistance curve according to FIG. 6. $I_{0.7}$=0.7 amps (total LED drive current during normal operation at room temperature)

For this example, the fail state current $I_{FS}$ is 70% of the normal LED current $I_{0.7}$, which corresponds to 30% of the LEDs being burned out:

$$I_{FS}=0.7A\times0.7=0.49A$$

While operating at the fail state current of 0.49A, from equation 4:

$$V_{ref}=0.49A\times2.5 \text{ ohm}=1.225V.$$

Therefore, according to equation 6, when 30% of the LEDs are burned out and Q1 is operating at room temperature:

$$V_{H-G}=1.225V\times(365+300)/(365+300+825)\times1.1$$

$$=0.6014$$

Thus, Q1 should be a transistor that has a turn on voltage of approximately 0.6000 volts at room temperature so that the power supply will be turned off (going into the fail state mode) when a little bit more than 30% of the LEDs are burned out.

Assuming Q1 has the a turn-on voltage characteristic as illustrated in FIG. 5, then at −40° C. the turn-on voltage of Q1 will be 0.68V and at +74° C. the turn-on voltage of Q1 will be 0.55V. Thus, at temperatures near −40° C., it would take less than the desired 30% of LEDs to burn out before the power supply is shut off, and at temperatures near +74° C. it would take more than the desired 30% of LEDs to burn out before the power supply is shut off. The use of the NTC4 as illustrated in FIG. 4 compensates for the changing transistor turn-on voltage so that Q1 turns on consistently when approximately 30% of the LEDs burn out, despite large changes in the ambient temperature of Q1.

At a low temperature (−40° C.), when 100% of the LEDs are on, total current to the LEDs will be 0.55A due to the increase of the forward voltage of the LEDs, and thus:

$$V_{ref}=0.55\text{A}\times 2.5\text{ ohms}=1.375\text{V}.$$

At −40° C., NTC2 has a resistance $R_{NTC2}$ of 1150 ohm. Therefore, using equation 6:

$$V_{H\text{-}G}=1.375\text{ V}(365+1150)/(365+1150+825)\times 1.1$$
$$=0.9792\text{V}.$$

Thus, when 30% of the LEDs are off, $V_{H\text{-}G}$ is only 70% of the 0.9792V value, or 0.6854V, which is much closer to the 0.68V turn-off voltage of the transistor at −40° C. compared to the turn on voltage (0.4725V) had $R_{NTC2}$ been held constant.

Likewise at a high temperature (+74° C.), when 100% of the LEDs are on, total current to the LEDs will be 0.90A due to the increased LED current drive as discussed above. Thus:

$$V_{ref}=0.90\text{A}\times 2.5\text{ ohms}=2.25\text{V}.$$

At +74° C., NTC2 has a resistance of 20 ohm. Therefore, using equation 6:

$$V_{H\text{-}G}=2.25\text{V}(365+20)/(365+20+825)\times 1.1$$
$$=0.7875\text{V}$$

Thus, when 30% of the LEDs are off, $V_{H\text{-}G}$ is only 70% of the 0.7875V value, or 0.5513V, which is much closer to the 0.55V turn-off voltage of the transistor at −40° C. compared to the turn on voltage (1.10V) had $R_{NTC2}$ been held constant.

The use of the NTC in the circuit design of FIG. 4 enables the power supply to maintain its “fail state” status with around 30% of the LEDs being turned off, throughout a temperature range of +74° C. to −40° C.

It is to be understood that the present invention is not limited to the sole embodiment described above and illustrated herein, but encompasses any and all variations falling within the scope of the appended claims. For example, the circuit design of FIG. 4 could utilize a PTC instead of an NTC to lower the transistor turn-on voltage $V_{1\text{-}2}$ as ambient temperature rises. In addition, it is conceivable that in certain climates only high temperature compensation or low temperature compensation would be required to meet light output specifications, but not both. In such a case, NTC1 or PTC1 could be eliminated from the circuit depicted in FIG. 1.

What is claimed is:

1. A circuit for driving a plurality of light emitting diodes, comprising:

- a power supply for generating an output voltage between a pair of output terminals that drives a plurality of light emitting diodes; and
- a voltage dividing circuit electrically connected to the pair of output terminals for adjusting the output voltage, the voltage dividing circuit including:
  - a positive temperature coefficient thermistor having a positive resistance slope characteristic wherein the resistance of the positive temperature coefficient thermistor increases as ambient temperature increases, and
  - a negative temperature coefficient thermistor having a negative resistance slope characteristic wherein the resistance of the negative temperature coefficient thermistor decreases as ambient temperature increases;
- wherein the positive and negative temperature coefficient thermistors are electrically connected, and the positive and negative resistance slope characteristics are selected, to increase the output voltage between the pair of output terminals when ambient temperature of the driving circuit deviates from room temperature.

2. The circuit of claim 1, wherein the positive and negative temperature coefficient thermistors are electrically connected together in series.

3. The circuit of claim 2, wherein the voltage dividing circuit further includes a variable resistor electrically connected in series with the positive and negative temperature coefficient thermistors.

4. The circuit of claim 3, wherein the voltage dividing circuit further includes:

- a first resistor electrically connected in parallel with the negative temperature coefficient thermistor; and
- a second resistor electrically connected in parallel with the positive temperature coefficient thermistor;
- wherein the first and second resistor are electrically connected together in series.

5. A circuit for driving a plurality of light emitting diodes, comprising:

- a power supply for generating an output voltage between a pair of output terminals that drives a plurality of light emitting diodes;
- a transistor having a characteristic turn-on voltage is electrically connected to the power supply for receiving a signal voltage from one of the pair of output terminals and for turning off the output voltage of the power supply when the signal voltage drops below the characteristic turn-on voltage of the transistor, wherein the characteristic turn-on voltage varies with ambient temperature of the transistor; and
- a compensation circuit that includes a thermistor having a resistance that changes with changes in ambient temperature;
- wherein the compensation circuit is electrically connected to the transistor to modify the signal voltage inputted to the transistor so that the transistor turns off the output voltage at a constant predetermined signal voltage independent of ambient temperature changes of the transistor.

6. The circuit of claim 5, wherein the thermistor is a negative temperature coefficient thermistor having a negative resistance slope characteristic so that the resistance of the negative temperature coefficient thermistor decreases as ambient temperature increases.

7. The circuit of claim 6, wherein the signal voltage is proportional to an electrical current flowing between the pair of output terminals.

8. The circuit of claim 7, wherein the signal voltage drops as the number of light emitting diodes driven by the power supply that are burned out increases.

9. The circuit of claim 8, wherein the characteristic turn-on voltage compensation circuit further includes a resistor that is connected in series with the negative temperature coefficient thermistor across a base and emitter of the transistor.

10. A traffic signal lamp, comprising:

- a plurality of light emitting diodes;
- a power supply electrically connected to the plurality of light emitting diodes for generating an output voltage that drives the plurality of light emitting diodes; and
- a voltage dividing circuit electrically connected to the power supply for adjusting the output voltage, the voltage dividing circuit including:

a positive temperature coefficient thermistor having a positive resistance slope characteristic wherein the resistance of the positive temperature coefficient thermistor increases as ambient temperature increases, and a negative temperature coefficient thermistor having a negative resistance slope characteristic wherein the resistance of the negative temperature coefficient thermistor decreases as ambient temperature increases;

wherein the positive and negative temperature coefficient thermistors are electrically connected, and the positive and negative resistance slope characteristics are selected, to increase the output voltage when ambient temperature of the traffic signal lamp deviates from room temperature.

11. The traffic signal lamp of claim 10, wherein the positive and negative temperature coefficient thermistors are electrically connected together in series.

12. The traffic signal lamp of claim 11, wherein the voltage dividing circuit further includes a variable resistor electrically connected in series with the positive and negative temperature coefficient thermistors.

13. The traffic signal lamp of claim 12, wherein the voltage dividing circuit further includes:

a first resistor electrically connected in parallel with the negative temperature coefficient thermistor; and a second resistor electrically connected in parallel with the positive temperature coefficient thermistor;

wherein the first and second resistor are electrically connected together in series.

14. A traffic signal lamp, comprising:

a plurality of light emitting diodes;

a power supply electrically connected to the plurality of light emitting diodes for generating an output voltage that drives the plurality of light emitting diodes and for generating a signal voltage that is proportional to the electrical current through the plurality of light emitting diodes;

a transistor having a characteristic turn-on voltage is electrically connected to the power supply for receiving the signal voltage and for turning off the output voltage of the power supply when the signal voltage drops below the characteristic turn-on voltage of the transistor, wherein the characteristic turn-on voltage varies with ambient temperature of the transistor; and a compensation circuit that includes a thermistor having a resistance that changes with changes in ambient temperature;

wherein the compensation circuit is electrically connected to the transistor to modify the signal voltage inputted to the transistor so that the transistor turns off the output voltage at a constant predetermined signal voltage independent of ambient temperature changes of the transistor.

15. The circuit of claim 14, wherein the thermistor is a negative temperature coefficient thermistor having a negative resistance slope characteristic so that the resistance of the negative temperature coefficient thermistor decreases as ambient temperature increases.

16. The circuit of claim 15, wherein the signal voltage drops as the number of light emitting diodes driven by the power supply that are burned out increases.

17. The circuit of claim 16, wherein the characteristic turn-on voltage compensation circuit further includes a resistor that is connected in series with the negative temperature coefficient thermistor across a base and emitter of the transistor.

18. A traffic signal lamp, comprising:

a plurality of light emitting diodes;

a power supply electrically connected to the plurality of light emitting diodes for generating an output voltage that drives the plurality of light emitting diodes; and a voltage dividing circuit electrically connected to the power supply for adjusting the output voltage, the voltage dividing circuit including a thermistor having a predetermined resistance slope characteristic wherein the resistance of the thermistor changes as ambient temperature changes, and wherein the thermistor is electrically connected, and the predetermined resistance slope characteristic is selected, to produce a predetermined change in the output voltage when ambient temperature of the traffic signal lamp deviates from room temperature.

19. The traffic signal lamp of claim 18, wherein the resistor is one of a positive temperature coefficient thermistor and a negative temperature coefficient thermistor, the positive temperature coefficient thermistor having a positive resistance slope characteristic wherein the resistance of the positive temperature coefficient thermistor increases as ambient temperature increases, the negative temperature coefficient thermistor having a negative resistance slope characteristic wherein the resistance of the negative temperature coefficient thermistor decreases as ambient temperature increases.

20. The traffic signal lamp of claim 19, wherein the voltage dividing circuit further includes a variable resistor electrically connected in series with the thermistor.

* * * * *